United States Patent [19]

Thompson

[11] Patent Number: 4,702,944

[45] Date of Patent: Oct. 27, 1987

[54] PROCESS FOR BINDING NON-WOVENS WITH ACRYLATE COMPOUNDS

[75] Inventor: Ronald J. Thompson, Sarnia, Canada

[73] Assignee: Polysar Limited, Sarnia, Canada

[21] Appl. No.: 800,272

[22] Filed: Nov. 21, 1985

Related U.S. Application Data

[60] Division of Ser. No. 763,892, Aug. 9, 1985, Pat. No. 4,563,289, which is a continuation of Ser. No. 598,928, Apr. 10, 1984, abandoned.

[51] Int. Cl.$^4$ .............................................. B05D 3/02
[52] U.S. Cl. ............................ 427/389.8; 427/389.9; 427/391; 427/392
[58] Field of Search .................................. 252/8.8, 8.6; 427/389.8, 389.9, 391, 389, 392

[56] References Cited

U.S. PATENT DOCUMENTS

| | | | |
|---|---|---|---|
| 4,268,546 | 5/1981 | Schwartz et al. | 427/393.5 |
| 4,356,229 | 10/1982 | Brodnyan et al. | 428/288 |
| 4,515,855 | 5/1985 | Ling | 427/389.9 X |

FOREIGN PATENT DOCUMENTS 0848808 9/1961 United Kingdom.

Primary Examiner—Thurman K. Page
Attorney, Agent, or Firm—Stevens, Davis, Miller & Mosher

[57] ABSTRACT

The resistance to heat and light aging of webs of natural or synthetic fibers is improved by using as a binder a composition comprising a latex of a polymer containing a carboxylic acid functional group, which has been neutralized with a fixed alkali, preferably in conjunction with a latent acid.

3 Claims, No Drawings

PROCESS FOR BINDING NON-WOVENS WITH ACRYLATE COMPOUNDS

This is a Division of application Ser. No. 763,892 filed Aug. 9, 1985, now U.S. Pat. No. 4,563,289, which in turn is a Continuation of Ser. No. 598,928 filed Apr. 10, 1984 now abandoned.

BACKGROUND OF THE INVENTION

The present invention pertains to non-woven products of natural or synthetic fibers having good heat stability, good wet strength and a low amount of cross-linking agents such as urea-formaldehyde or N-methylolacrylamide.

Such non-woven webs include a large number of products from papers of natural or synthetic fibers to loose webs of cellulose or synthetic fibers including synthetic organic fibers such as rayon, polyesters, or nylon and synthetic inorganic fibers such as glass. Non-woven webs may be wet laid, carded or air laid. The fibers are bound together with a bonding agent which may be a naturally occurring binder such as starch or protein or a synthetic polymer.

There has been an increasing use of non-woven products in our society. Non-wovens of natural or synthetic organic fibers are used for wiping cloths, disposable table cloths, disposable clothing such as lab coats, diapers, surgical drapes and disposable bedding. In these applications there is a growing trend to reduce or eliminate crosslinking agents which may irritate the skin. Such crosslinking agents tend to enhance the wet tensile strength of the web when it is being impregnated with the binder. Non-wovens of inorganic fibers such as glass are used to produce webs which may be used to make shingles or road underlay material.

In the past one of the major synthetic binders for non-wovens has been acrylate latices. These latices contained polymers which have a low level of unsaturation and are more stable to heat and light degradation than binders containing conjugated diolefins. Acrylic binders tend to be relatively expensive and this contributes to the cost of the finished web. In some instances antioxidants when used may be incompatible with inks and dyes intended to be used on the web as the antioxidant may interfere with the curing of the ink. It would be desirable to find a low cost method of providing a non-woven web having good heat and light stability. The heat aging properties of the compounds of the present invention, particularly those based on carboxylated SBR latices, or vinyl acetate type latices suggest that such compounds could be utilized as low cost paints.

Typical of the current state of the art of non-woven webs are: U.S. Pat. No. 4,356,229 issued Oct. 26, 1982, assigned to Rohm and Haas Company; European patent application No. 0 071 932 published 16.02.83 in the name of the B. F. Goodrich Company; European patent application No. 0 012 032 published 11.06.78 in the name of Rohm and Haas Company; and U.S. Pat. No. 4,268,546 issued May 19, 1981, assigned to The Dow Chemical Company. These patents illustrate the current trend in the art to use acrylate polymers in manufacturing non-woven webs.

Much of the work done with the heat stability of polymers has been based on polyvinyl chloride. A very good discussion of the current state of technology of heat stabilizers appears in Chapters 8 and 9 of Encyclopedia of PVC, Vol. 1, edited by Leonard I. Nass, Marcel Dekker Inc. 1976. This text shows at page 298 that sodium and potassium oxides or hydroxides are not considered heat and light stabilizers.

British patent specification No. 848,808 teaches the use of latex in manufacturing paper. The British patent discloses that the latex may be neutralized with a fixed alkali such as NaOH subsequent to polymerization. The patent teaches that during the curing operation the alkali ion must be replaced with a polyvalent ion to crosslink the polymer. This is not required nor desirable in the present case.

SUMMARY OF THE INVENTION

The present invention provides a method of manufacturing a non-woven web of natural or synthetic fibers which comprises impregnating the web with from about 15 to 60% by weight, based on the dry weight of the web with a composition comprising a latex containing from about 30 to 65% by weight of a polymer formed by polymerizing a monomeric mixture selected from:

(A) (i) from about 30 to about 70 weight % of a $C_{8-12}$ vinyl aromatic monomer which may be unsubstituted or substituted by a $C_{1-4}$ alkyl or alkanol radical or a chlorine or bromine atom;
(ii) from about 70 to about 30 weight % of a $C_{4-8}$ conjugated diolefin;
(iii) from about 0.5 to 8.0 parts by weight of a $C_{3-9}$ ethylenically unsaturated carboxylic acid or an anhydride of a $C_{4-9}$ ethylenically unsaturated dicarboxylic acid;

(B) (i) from about 50–99.5 weight % of a $C_{1-8}$ alkyl or alkanol ester of acrylic or methacrylic acid or a mixture thereof;
(ii) from about 30 to about 50 weight % of a $C_{8-12}$ vinyl aromatic monomer, a $C_{2-4}$ alkenyl nitrile or a mixture thereof;
(iii) from about 0.5 to 20 weight % of a $C_{3-9}$ ethylenically unsaturated acid, or an anhydride of a $C_{4-9}$ ethylenically unsaturated dicarboxylic acid; and (C) (i) from about 60 to about 99.5 weight percent of a $C_{1-8}$ alkyl or alkanol ester of a $C_{3-12}$ ethylenically unsaturated acid or a $C_{2-8}$ alkenyl or alkenol ester of a $C_{1-12}$ saturated carboxylic acid;
(ii) from about 0.5 to about 40 weight percent of a $C_{3-9}$ ethylenically unsaturated carboxylic acid or an anhydride of a $C_{4-9}$ ethylenically unsaturated dicarboxylic acid; said latex containing sufficient alkali metal base to provide a pH of from about 5 to about 9 and curing said web.

The present invention also provides webs made by the above process and the compound used in the above process to bind the web. Such compounds may be used as a basis for paint.

DESCRIPTION OF THE PREFERRED EMBODIMENTS

It has been found that the process of the present invention is useful with acrylic, acrylate, carboxylated styrene butadiene or vinyl acetate latices. The latices may comprise a polymer formed by polymerizing from about 50 to 99.5 weight % of a $C_{1-8}$ alkyl or alkanol ester of acrylic or methacrylic acid or a mixture thereof, from about 30 to 50 weight % of a $C_{8-12}$ vinyl aromatic monomer or methyl methacrylate, or a $C_{2-4}$ alkenyl nitrile, and from 0.5 to 20 weight % of a $C_{3-9}$ ethylenically unsaturated carboxylic acid.

Typical acrylate esters include methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, ethyl hexyl acrylate, ethyl hexyl methacrylate, hydroxylethyl acrylate, and hydroxylethyl methacrylate.

Typical vinyl aromatic monomers include styrene, α-methyl styrene, p-methyl styrene, and di-vinyl benzene.

Useful ethylenically unsaturated acids include ethylenically unsaturated mono- and di- carboxylic acids containing up to about 9 carbon atoms. Suitable acids include acrylic acid, methacrylic acid, fumaric acid, itaconic acid, butenoic acid, pentenoic acid, hexenoic acid, heptenoic acid and octenoic acid.

The present invention is also useful with carboxylated styrene butadiene latices which are made by polymerizing:

(i) from about 42 to 68, preferably about 55 to 65, weight % of a $C_{8-12}$ vinyl aromatic monomer which may be unsubstituted or substituted by a $C_{1-4}$ alkyl or alkanol radical or a chlorine or bromine atom;

(ii) from about 20 to 58, preferably from about 35 to 45, weight % of a $C_{4-8}$ conjugated diolefin, preferably butadiene or isoprene; and (iii) from about 0.5 to 8.0 parts by weight, preferably from about 0.5 to 5 weight %, of a $C_{3-9}$ ethylenically unsaturated acid or an anhydride of a $C_{4-9}$ ethylenically unsaturated dicarboxylic acid.

Suitable $C_{8-12}$ vinyl aromatic monomers include those referred to previously and chlorostyrene, bromostyrene, and p-t-butyl styrene.

Suitable $C_{3-9}$ ethylenically unsaturated monocarboxylic acids include acrylic acid, methacrylic acid, butenoic acid, pentenoic acid, hexenoic acid, heptenoic acid, octenoic acid, and cinnamic acid. Anhydrides of $C_{4-9}$ ethylenically unsaturated acids include fumaric anhydride and itaconic anhydride.

Vinyl acetate and acrylate type latices are prepared from a monomeric mixture comprising:

(i) from about 60 to about 99.5 weight per cent of a $C_{1-8}$ alkyl or alkanol ester of a $C_{3-12}$ ethylenically unsaturated acid or a $C_{2-8}$ alkenyl or alkenol ester of a $C_{1-12}$ saturated carboxylic acid;

(ii) from about 0.5 to about 40 weight percent of a $C_{3-9}$ ethylenically unsaturated carboxylic acid or an anhydride of a $C_{4-9}$ ethylenically unsaturated dicarboxylic acid; optionally such a monomeric mixture may include up to about 40 weight percent of a $C_{2-4}$ mono-olefin.

Suitable $C_{2-8}$ alkenyl or alkenol esters of $C_{1-12}$ saturated acids are homologues of the alkyl or alkanol esters of acrylic or methacrylic acid described above. $C_{2-8}$ alkenyl esters of $C_{1-12}$ carboxylic acids include vinyl acetate and its higher homologues. When the alkenyl radical contains a hydroxyl group, the ester is a $C_{2-8}$ alkenol ester of the saturated acid.

The process for polymerizing such acids is well known and does not form part of this invention. Such processes are well known to those skilled in the art and involve the use of conventional catalysts and initiators, surfactants, electrolytes and molecular weight control agents (chain transfer agents). Generally the latex will contain from about 30 to 65% by weight of polymeric solids, preferably about 45 to 60% by weight.

Generally, in the polymerization of polymers containing carboxylic acid monomers the latex is neutralized, usually after the polymerization reaction or after stripping the residual unpolymerized monomer from the latex. In the prior art the latex is neutralized with a fugitive or volatile base such as ammonium hydroxide, or a lower alkyl amine. According to the present invention the carboxylic acid groups in the polymer must be neutralized with an alkali metal base, preferably a hydroxide of sodium or potassium.

To obtain the benefits of the present invention, it is important that the polymer in its end use be neutralized with a fixed alkali. It is best to neutralize the latex directly with a fixed alkali. However, in applications where the latex is heated, it is possible to initially neutralize the latex with a fugitive base, then add sufficient fixed alkali to neutralize the carboxyl group in the polymer after the fugitive base is driven off. As used in this specification, the phrase "containing sufficient alkali metal base to provide a pH from about 5 to 9' includes a latex which may have been originally neutralized with a fugitive base and then had sufficient alkali metal base added to it to keep the latex at the required pH as the fugitive base is driven off.

Preferably, the latex is adjusted to a pH of from about 5 to about 9 with the alkali metal base. Preferably the latex is neutralized to a pH of about 6.5 to 8.5. The most preferred pH is in the range from about 7 to about 8. The most preferred pH is about 7.5.

In accordance with the preferred embodiment of the present invention the latex is then compounded with a latent acid in an amount from 0.25 to about 3 parts by weight per 100 parts by weight of polymer. As used in this specification the term latent acid means a chemical which when dissolved in an aqueous system and subjected to heat and drying conditions will generate an acid. Preferred latent acids are the salts of a volatile base and a strong acid. Preferred volatile bases include ammonium hydroxide and $C_{1-4}$ alkyl or alkanol amines. Preferred strong acids include hydrochloric acid, nitric acid, sulphuric and sulphonic acids. Suitable latent acids include ammonium chloride, ammonium nitrate, ammonium sulphate, $C_{1-4}$ alkyl or alkanol amine hydrochlorides or hydrobromides. The preferred latent acids are ammonium chloride, and ammonium nitrate and amine derivatives of p-toluene sulphonic acid.

The latent acid may be used in amounts from about 0.5 to about 3 parts per 100 parts of latex solids. There is little to gain by using in excess of 3 parts by weight per 100 parts by weight of latex solids. In fact, excess latent acid may harm the non-woven web and be detrimental to the heat and ageing properties of the web. The latent acid is preferably used in amounts from about 0.5 to 1 part by weight per 100 parts by weight of latex solids. The preferred amount is 1 part per 100 parts by weight of latex solids.

The non-woven web is then impregnated with a compound based on the latex. It is not necessary to add conventional heat stabilizers to this compound unless exceptional heat stability is required. It should also be recognized that in some cases, heat and light stabilizers colour the web and lower the tensile strength of the web. The web takeup is usually about 15 to 60% by weight of the solids in the latex based on the weight of the dry web. A preferred takeup is from about 30 to 50% by weight.

Compounding and impregnation techniques are well known and do not form part of this invention. The web may pass through an impregnation bath and then through squeeze rollers to control the pickup of latex from the web. The web may be contacted with a roller coater or may be sprayed with the compound.

Webs which may be used in the present invention may be made of natural or synthetic fiber or a mixture thereof. If a mixture is used it usually comprises from about 70 to 30 weight % of natural fibers and from 30 to 70 weight % of synthetic fibers. The web may be entirely synthetic fiber such as a polyester or nylon. The web may also be a synthetic inorganic fiber such as glass. The non-woven web may be carded or wet or air laid. The web may weigh from about 5 to 130, preferably from about 10 to 25 g/yd$^2$.

The following examples illustrate the present invention and are not intended to limit its scope. In the examples, unless otherwise stated, the units are in parts by weight.

A latex was prepared by polymerizing a monomeric mixture comprising about 50 weight % styrene, about 47 weight % butadiene, and about 3 weight % acrylic acid. Subsequent to polymerization, a portion of the latex was neutralized with KOH and a portion neutralized with NH$_4$OH. A polyester web weighing about 12 oz/yd$^2$ was impregnated with the compound and dried at about 180° F. then cured for a short time at about 350° F. The resulting web was subjected to heat aging at 350° F. for a period of time up to 10 min. and measurements of wet tensile strength and elongation at break were taken. The heat discolouration of the web will increase with prolonged heating, and thus, the results at over 10 minutes, at 350° F., were not measured. The reflectance of the samples multiplied by 1000 was also recorded. The results are recorded in Table I.

In Table I CMD means cross machine direction. Clearly best production against heat aging occurs with KOH at pH's from 6 to 9. The best heat aging results are in the pH range of 7-8. This data also shows that the tensile strength of the web is below the control, neutralized with NH$_4$OH.

The experiment was repeated with the following changes. The latex was neutralized to a pH of 7.75 with KOH. To the latex various amounts of NH$_4$Cl were added. The results are recorded in Table II.

In Table II phls is parts by weight per 100 parts by weight latex solids. Table II clearly shows that an improved balance of wet tensile strength, elongation at break, and resistance to heat ageing is obtained by using as a binder a latex containing both a fixed alkali and a latent acid.

A commercially available acrylate (Rhoplex *1715-trademark of Rohm & Haas Company) was tested for heat stability when neutralized with KOH or NH$_4$OH. A web weighing about 12 g/yd$^2$ was used. The results are set forth in Table III.

In the experiments, the lower the reflectance reading, the less discoloration in the sample.

TABLE I

| Sample | 1 | 2 | 3 | 4 | 5 | 6 | 7 |
|---|---|---|---|---|---|---|---|
| KOH, pH = | 5.0 | 6.0 | 7.0 | 8.0 | 9.0 | 10.0 | Control |
| NH$_4$OH, pH = | — | — | — | — | — | — | 9.0 |
| Web Polyester 12.5 g/yd$^2$ | | | | | | | |
| Pick-up, % | 47.5 | 56.5 | 63.5 | 59.4 | 55.2 | 63.9 | 58.3 |
| Weight - g/yd$^2$ | 18.4 | 19.6 | 20.4 | 19.9 | 19.4 | 20.5 | 19.8 |
| Tensile Strength | | | | | | | |
| CMD-Wet lb./in. | 0.64 | 0.68 | 0.48 | 0.36 | 0.29 | 0.27 | 0.63 |
| Elongation - % | 52.6 | 78.6 | 75.3 | 34.5 | 23.2 | 26.0 | 69.2 |
| Heat Aging at 350° F. (Reflectance) | | | | | | | |
| Minutes - 0 | 25 | 25 | 13 | 6 | 13 | 13 | 6 |
| 3 | 82 | 25 | 12 | 12 | 6 | 12 | 100 |
| 6 | 167 | 51 | 25 | 19 | 19 | 37 | 268 |
| 10 | 301 | 164 | 25 | 25 | 31 | 43 | 369 |

TABLE II

| Sample | 1 | 2 | 3 | 4 | 5 | 6 |
|---|---|---|---|---|---|---|
| KOH pH = | | | | 7.75 | | |
| NH$_4$OH pH = | — | — | — | — | — | 9.0 |
| NH$_4$Cl phls | 0 | 0.25 | 0.5 | 1.0 | 1.5 | Nil |
| Web Polyester @ 12.5 g/yd$^2$ | | | | | | |
| Pick-up % | 49.7 | 53.4 | 61.2 | 57.8 | 55.1 | 63.0 |
| Weight g/yd$^2$ | 18.7 | 19.2 | 20.2 | 19.7 | 19.4 | 20.4 |
| CMD-Wet lb./in. | 0.34 | 0.45 | 0.57 | 0.65 | 0.51 | 0.64 |
| Elongation - % | 39.1 | 37.7 | 75.6 | 88.8 | 80.9 | 65.6 |
| Heat Aging @ 350° F. (Reflectance) | | | | | | |
| at Minutes - 10 | 44 | 50 | 50 | 62 | 75 | 328 |

TABLE III

| | Sample | | | | | | |
|---|---|---|---|---|---|---|---|
| | 10 | 11 | 12 NH$_3$ | 13 | 14 | 15 KOH | 16 |
| pH | 6.7 | 8.5 | 10.0 | 11.0 | 8.5 | 10.0 | 11.0 |
| Web-(B) | | | | | | | |
| Pick-up % | 52.0 | 52.4 | 50.3 | 50.4 | 50.6 | 55.1 | 55.6 |
| CMD-lb/in | | | | | | | |
| Dry | 1.29 | 1.12 | 1.12 | 1.04 | 1.02 | 1.20 | 1.37 |
| Wet | 0.81 | 0.72 | 0.71 | 0.67 | 0.44 | 0.09 | .07 |
| Elongation % | | | | | | | |
| Dry | 48.9 | 50.5 | 43.8 | 43.4 | 39.9 | 36.5 | 46.7 |
| Wet | 41.0 | 40.9 | 38.2 | 33.0 | 19.2 | 15.5 | 18.5 |
| Heat Aging @ 350° F. (Reflectance) | | | | | | | |
| Minutes | | | | | | | |
| 0 | 18 | 24 | 18 | 18 | 12 | 18 | 24 |
| 1 | 24 | 24 | 30 | 24 | 24 | 24 | 36 |
| 3 | 109 | 108 | 88 | 81 | 18 | 24 | 30 |
| 4 | 189 | 158 | 185 | 157 | 18 | 6* | 24 |
| 6 | 221 | 275 | 270 | 221 | 18 | 30 | 26 |
| UV-Aging @ 140° F. (Reflectance) | | | | | | | |
| Hours | | | | | | | |
| 24 | 19 | 19 | 25 | 18 | 12 | 12 | 12 |
| 48 | 19 | 25 | 18 | 18 | 31 | 24 | 25 |
| 72 | 25 | 25 | 19 | 19 | 12 | 12 | 18 |

*Anomalous result

A sample of latex was prepared as described in Example 1 except that the latex was neutralized to a pH of 8.1 with NH$_4$OH. Two samples of this latex were than adjusted to a pH of 10 with NH$_4$OH in one case and KOH in the other case. NH$_4$Cl was added to a portion of the latex containing KOH in an amount of 1.5 parts by weight per 100 parts of polymer. An Owens/Corning 670M (Trademark) ⅛" glass web with a weight of about 70 gm/yd$^2$ was impregnated with the binder and the sample dried and cured. The dried sheets were then subjected to a heat ageing test and the reflectance multiplied by 1000 was recorded. The results are shown in Table IV.

TABLE IV

| Minutes at 400° F. | 1.5 | 1.5 | 3.0 | 5.0 | 7.0 | 10.0 |
|---|---|---|---|---|---|---|
| A - NH₄OH | 57 | 63 | 83 | 117 | 185 | 200 |
| B - KOH | 51 | 44 | 57 | 50 | 57 | 63 |
| C - KOH + NH₄Cl | 51 | 50 | 57 | 76 | 76 | 83 |

The wet and dry tensile strength of the webs were then measured at various cure time at 400° F. The results are recorded in Table V.

TABLE V

| | Tensile Strength lb./in. | | | | | |
|---|---|---|---|---|---|---|
| | NH₄OH | | KOH | | KOH + NH₄Cl | |
| Time | Dry | Wet | Dry | Wet | Dry | Wet |
| 0.5 | 18.8 | 5.0 | 18.4 | 5.0 | 14.8 | 2.8 |
| 5.0 | 15.2 | 6.2 | 20.0 | 9.2 | 14.0 | 6.8 |
| 10.0 | 18.8 | 7.8 | 19.6 | 9.0 | 20.8 | 7.8 |

What is claimed is:

1. A method of saturating a non-woven web of natural or synthetic fibers comprising impregnating a web having a dry weight from 5 to 130 g/yd² with from about 30 to 50% by dry weight, based on the dry weight of the web of a composition based on a polymer comprising
    (i) from 50–99.5 weight % of a $C_{1-8}$ alkyl or alkanol ester of acrylic or methacrylic acid or a mixture thereof;
    (ii) from about 30 to 50 weight % of one or more monomers selected from the group consisting of $C_{8-12}$ vinyl aromatic monomers, methyl methacrylate and $C_{2-4}$ alkenyl nitriles;
    (iii) from about 0.5 to 20 weight % of a $C_{3-9}$ ethylenically unsaturated carboxylic acid or an anhydride of a $C_{4-9}$ ethylenically unsaturated di-carboxylic acid;

the improvements comprising using a latex which has been neutralized to a pH from 6.5 to 8.5 using an alkali metal hydroxide selected from the group consisting of sodium hydroxide, potassium hydroxide or a mixture thereof; and said compound contains from about 0.25 to 3.0 parts by weight per 100 parts by weight of said polymer of a latent acid selected from the group consisting of p-toluene sulfonic acid, ammonium chloride, ammonium nitrate, ammonium sulfate, and chlorides, nitrates and sulfates of $C_{1-4}$ alkyl and alkanol amines; and drying and curing the web in the absence of a polyvalent metal ion.

2. A method according to claim 1 wherein said latent acid is present in an amount from 0.5 to 1.5 parts by weight per 100 parts by weight of said polymer and is selected from the group consisting of ammonium chloride, ammonium nitrate and ammonium sulfate.

3. A method according to claim 2 wherein said web comprises up to about 30% natural fiber and the balance of one or more synthetic fibers selected from the group consisting of polyester fibers, polyamide fibers and glass fibers.

* * * * *